United States Patent [19]
Itojima et al.

[11] Patent Number: 5,956,128
[45] Date of Patent: Sep. 21, 1999

[54] PHOTO-PROCESSING APPARATUS

[75] Inventors: Mitsuhiko Itojima; Kazuhiro Kobayashi; Keiji Morimoto, all of Wakayama, Japan

[73] Assignee: Noritsu Koki Co., Ltd., Wakayama-ken, Japan

[21] Appl. No.: 09/149,777

[22] Filed: Sep. 8, 1998

[30] Foreign Application Priority Data

Sep. 12, 1997 [JP] Japan .................................. 9-248675

[51] Int. Cl.[6] .................................................. G03B 27/32
[52] U.S. Cl. ............................... 355/27; 355/60; 355/63; 355/45; 396/613
[58] Field of Search ............................... 355/70, 27, 55, 355/63, 45; 414/749; 396/613

[56] References Cited

U.S. PATENT DOCUMENTS 4,884,100  11/1989  Kitajima et al. .
5,473,411  12/1995  Miyawaki et al. .
5,801,811   9/1998  Lo et al. .

*Primary Examiner*—Safet Metjahic
*Assistant Examiner*—Emily C. Jones
*Attorney, Agent, or Firm*—Jordan and Hamburg LLP

[57] ABSTRACT

An enlargement lens is moved to a retracted position by driving a lens moving deck, and temporarily transferred onto a lens storing deck. After the lens moving deck is returned to its initial position, the enlargement lens is rotatably supported on support rails and rotated about its rotatable shaft to expose a lens surface to the outside for the cleaning. Accordingly, the enlargement lens can easily be cleaned.

10 Claims, 11 Drawing Sheets

PHOTO-PROCESSING APPARATUS

BACKGROUND OF THE INVENTION

This invention relates to the cleaning of an enlargement lens in a photo-processing apparatus used in a photo laboratory or the like.

A schematic construction of a conventional photo-processing apparatus 1 is shown in FIG. 10. A rolled photosensitive material (printing paper) 10 is fed inside a dark room 2 from an upper part of the apparatus 1, cut to a specified length by a cutter 4, and then placed on an exposure table 3 provided substantially at 45° to the ground. An enlargement lens unit 20 is arranged such that an optic axis L thereof is normal to the exposure table 3, i.e., substantially at 45° to the ground in a direction opposite to the exposure table 3. A light source 11 is so arranged via a mirror unit 12 as to be substantially normal to the optic axis L of the enlargement lens unit 20. Between the light source 11 and the enlargement lens unit 20 is provided a film feeding mechanism (not shown) for feeding a negative film. Further, an operation panel 13, a monitor display device 14 and the like are provided in vicinity of the light source 11 and the enlargement lens unit 20. The exposed photosensitive material 10 is conveyed to a developing unit 30 via a conveying mechanism 5 including a belt and the like, and is discharged onto the top of the apparatus 1 after being developed, fixed, water-washed and dried.

Next, the detail of the enlargement lens unit in the conventional photo-processing apparatus is shown in FIG. 11. The enlargement lens unit 20 includes a lens moving deck 21 which is movable along a specified direction X–X' (e.g., a direction normal to the plane of FIG. 10) by, e.g., a ball screw mechanism or a belt driving mechanism (not shown), a main lens 22 such as a zoom lens placed on the lens moving deck 21, a mirror 23 and an auxiliary lens 24 such as a single-focus lens. The lens moving deck 21 is divided into three areas. The mirror 23 is placed on a mirror mount area B in the middle and the main and auxiliary lenses 22, 24 are placed on first and second lens mount areas A, C at the opposite sides of the mirror mount area B, respectively.

The main lens 22 such as a zoom lens enables the processing of pictures of two different sizes by one apparatus by suitably switching a focal length (angle of view), for example, in the case that a film having a 135 size includes images photographed in normal photographing mode and those photographed in panorama photographing mode. The auxiliary lens 24 such as a single-focus lens is used, for example, in the case that a film has a large frame size such as 120 or an enlargement magnification is large. The mirror 23 is adapted to bend a propagation direction of light having transmitted through an aperture 50 and a film placed so as to face the aperture 50 substantially at 90° to introduce the light to an optical sensor 25. The optical sensor 25 detects the state of the film, i.e., the respective color components of yellow, magenta and cyan which are complementary colors of three primary colors (red, blue, green). A ratio of the respective colors, an exposure time and other factors are determined based on an output of the optical sensor 25.

However, the production of fine paper dust is unavoidable in the aforementioned conventional photo-processing apparatus since the photosensitive material 10 is cut to a specified length by the cutter 4. Thus, the paper dust deposits on the surface of the enlargement lens (the main lens 22 or the auxiliary lens 24) by continuously using the apparatus 1 for a long time. Although the dark room 2 and the developing unit 30 are separated, a mist of developer and/or lubricant flying in the air via a clearance provided between the dark room 2 and the developing unit 30 to feed the photosensitive material 10 deposits on the surface of the enlargement lens. Therefore, the surfaces of the enlargement lenses need to be cleaned at regular intervals.

In the conventional photo-processing apparatus, after the photosensitive material 10 is retracted from the dark 2, a door (not shown) of the dark room 2 is opened and an operator slips into the dark room 2 to clean the surfaces of the enlargement lenses provided in the enlargement lens unit 20 using a brush, blower, cloth or the like. Operability is very poor since a work space is very narrow and dark. Further, since it is difficult to see the surfaces of the lenses during the cleaning, it is difficult to completely clean the lens surfaces.

SUMMARY OF THE INVENTION

It is an object of the present invention to provide a photo-processing apparatus which has overcome the problems residing in the prior art.

According to an aspect of the present invention, a photo-processing apparatus comprises: a lens moving deck including a lens mount area for mounting an enlargement lens and a mirror mount area for mounting a mirror for introducing light having transmitted through a film to an optical sensor, and being movable along a first direction so that the lens mount area can be located in either one of an exposure position and a retracted position which are located next to each other, a supporter provided in the retracted position of the lens mount area for engaging the enlargement lens and rotatably supporting the enlargement lens, and a container for containing the lens moving deck therein to block an exposure to external light, the container including a door which is openably and closably provided in vicinity of the retracted position.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
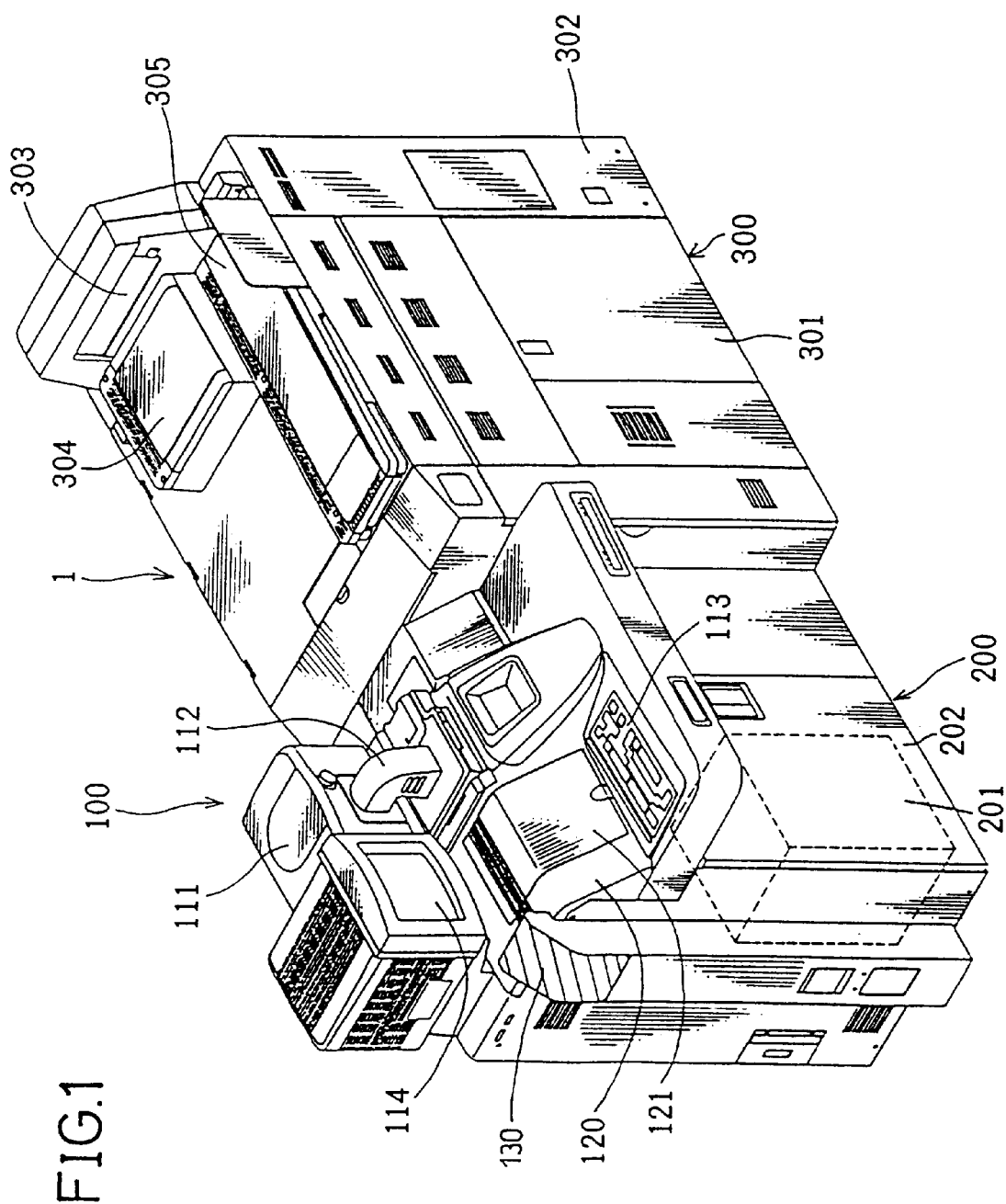
FIG. 1 is a perspective view showing an external configuration of a first photo-processing apparatus embodying the invention.

A first photo-processing apparatus embodying the invention is described with reference to FIGS. 1 to 7. FIG. 1 is a perspective view showing an external configuration of the first embodiment. The apparatus 1 is provided with an exposure unit 100 for exposing a photosensitive material (printing paper) by enlargedly projecting an image onto a film, a photosensitive material unit (PM unit) 200 for containing a roll of photosensitive material and feeding it to the exposure unit 100 after cutting it to a specified size, and a developing unit 300 for developing, fixing, water-washing and drying the exposed photosensitive material.

The PM unit 200 is provided below the exposure unit 100 and accommodates a dark box 201 for containing the roll of printing paper in such a manner as not to expose it to light. An example of a new roll of photosensitive material is: about 180 m in length and 14 kg in weight including the dark box 201. Thus, withdrawable support rails (not shown) on which the dark box 201 is placed to be contained in the PM unit 200 are provided inside a door 202. When the dark box 201 is mounted in the PM unit 200, the photosensitive material is dispensed from the dark box 201, cut to a specified length by a cutter (not shown) and then fed to the exposure unit 100.

The exposure unit 100 includes an enlargement lens unit to be described later, a light source 111, a mirror unit 112 for bending an optical path of light from the light source 11 substantially at right angles to introduce the light to the enlargement lens unit, an operation panel 113, a monitor display device 114 and a container 120 for covering the enlargement lens unit and blocking light from the outside.

The developing unit 300 is adapted to develop, fix, water-wash and dry the exposed photosensitive material as described above. The photosensitive material should not be exposed to a stray light at least during an entire developing process and at an initial stage of a fixing process. Thus, the developing unit 300 is comprised of two sections: a dark room 301 where at least the developing, fixing and water-washing processes are performed and a drying section 302 where a drying process is performed. The dried photosensitive material (i.e., pictures) are discharged through a discharge port 303 at the top of the developing unit 300, and are stacked on a first conveyance belt 304 by, e.g., the number of exposures made to one film. When one film is processed, the discharged pictures are conveyed to a second conveyance belt 305 by the first conveyance belt 304 and held thereon. Pictures corresponding to a plurality of films can be held on the second conveyance belt 305.

Figure 2:
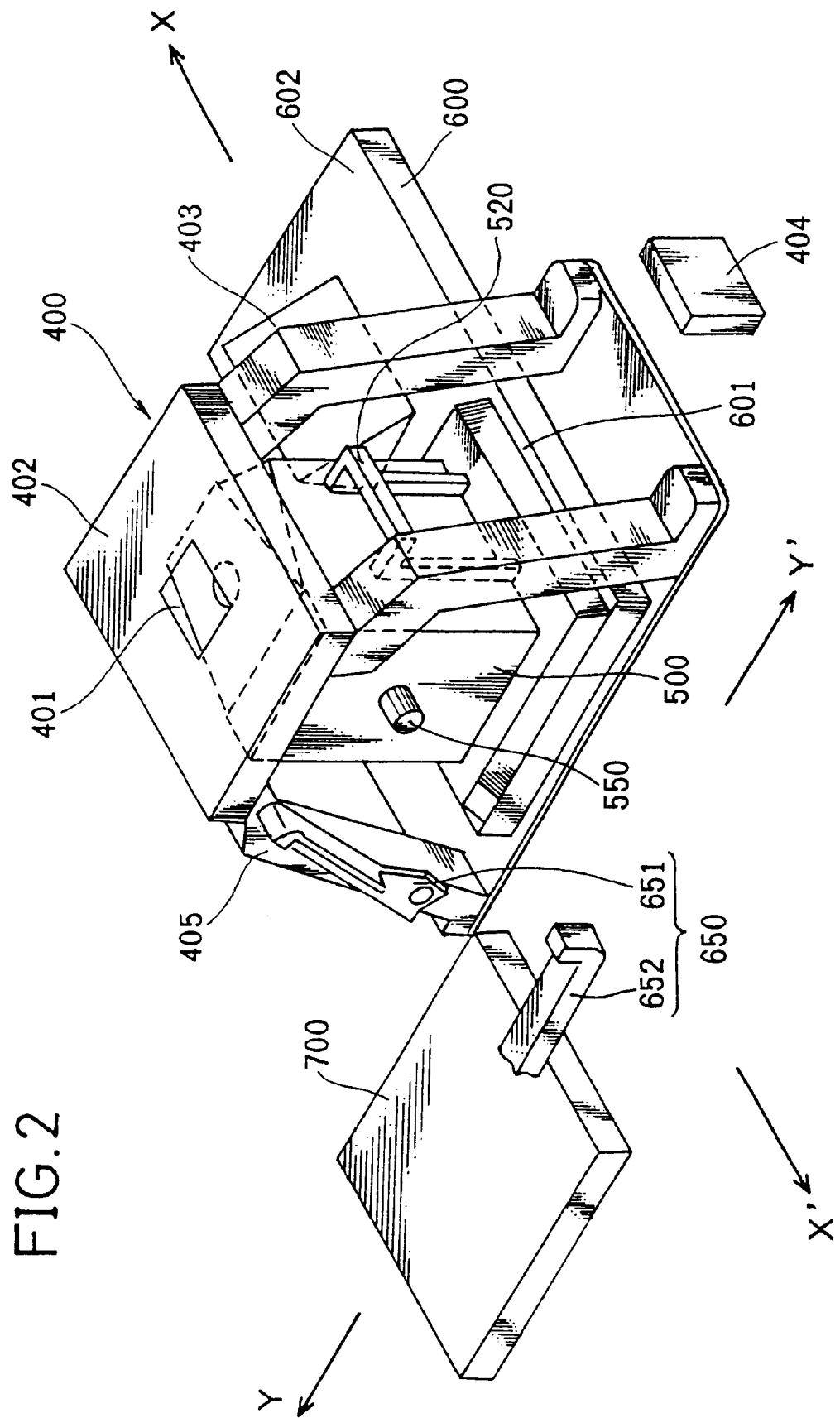
FIG. 2 is a perspective view of an enlargement lens unit of the first photo-processing apparatus when an enlargement lens is in an exposure position.
Figure 3:
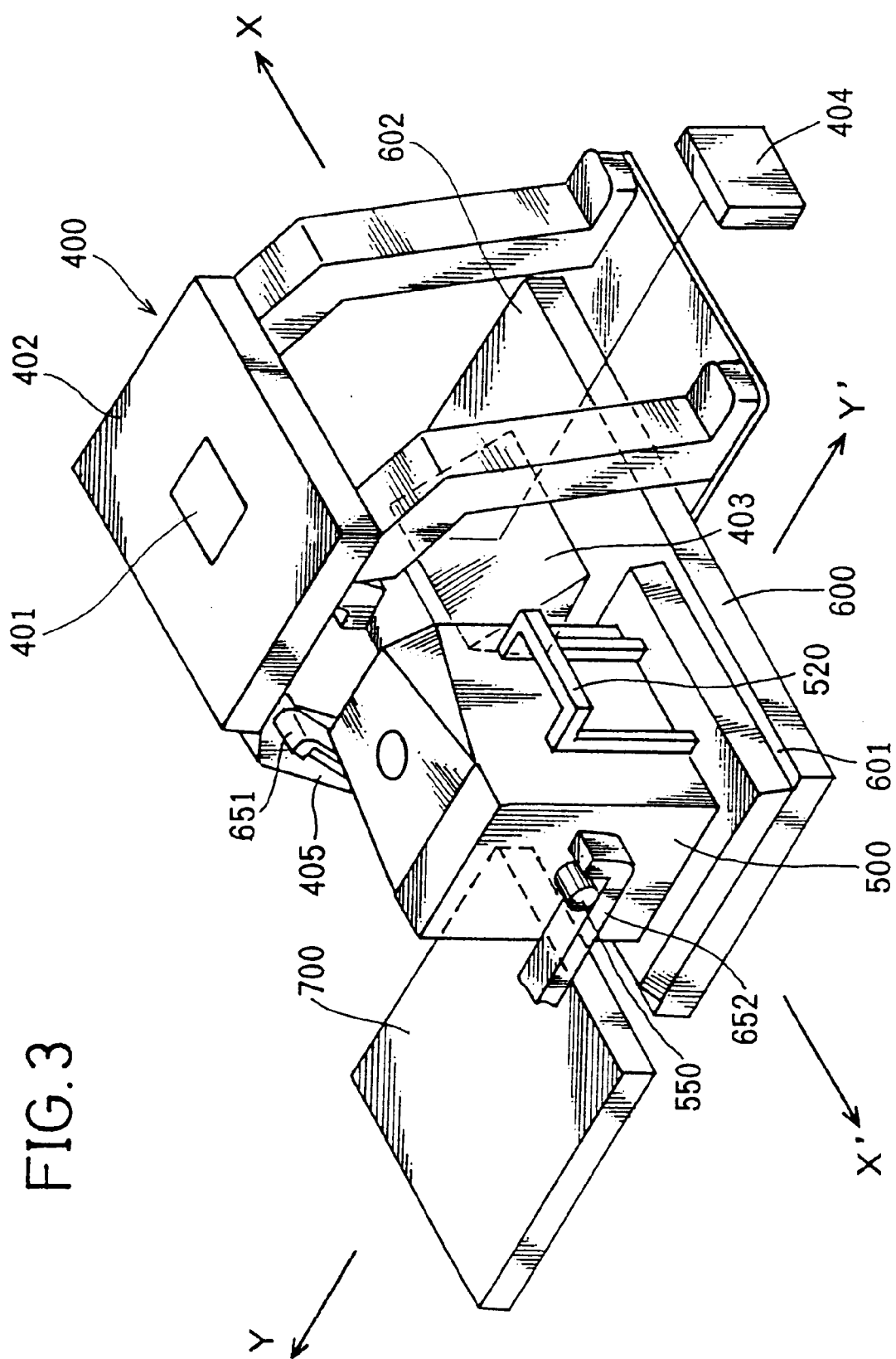
FIG. 3 is a perspective view of the enlargement lens unit when the enlargement lens is in a retracted position.
Figure 4:
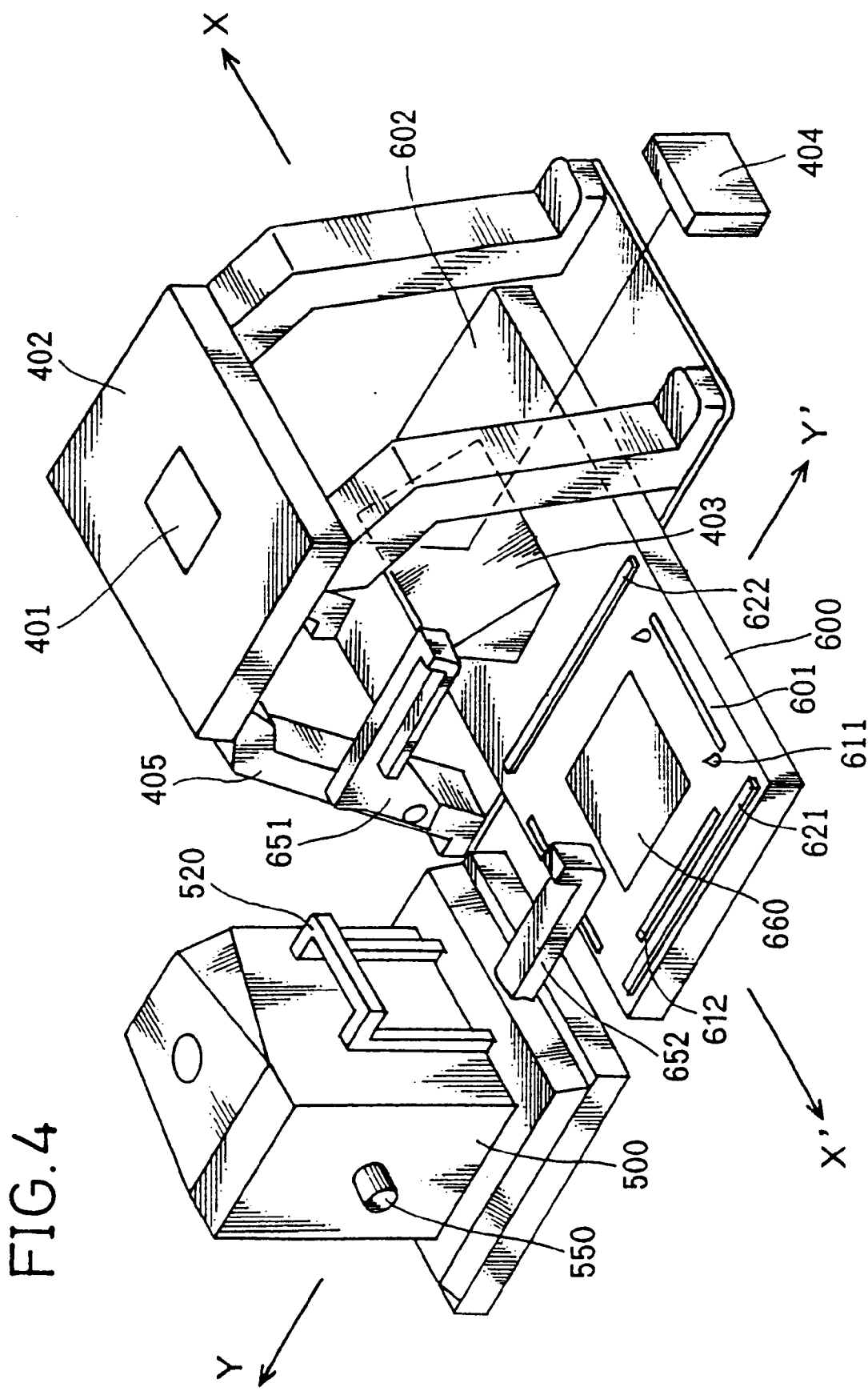
FIG. 4 is a perspective view of the enlargement lens unit when the enlargement lens is placed on a lens container deck.
Figure 5:
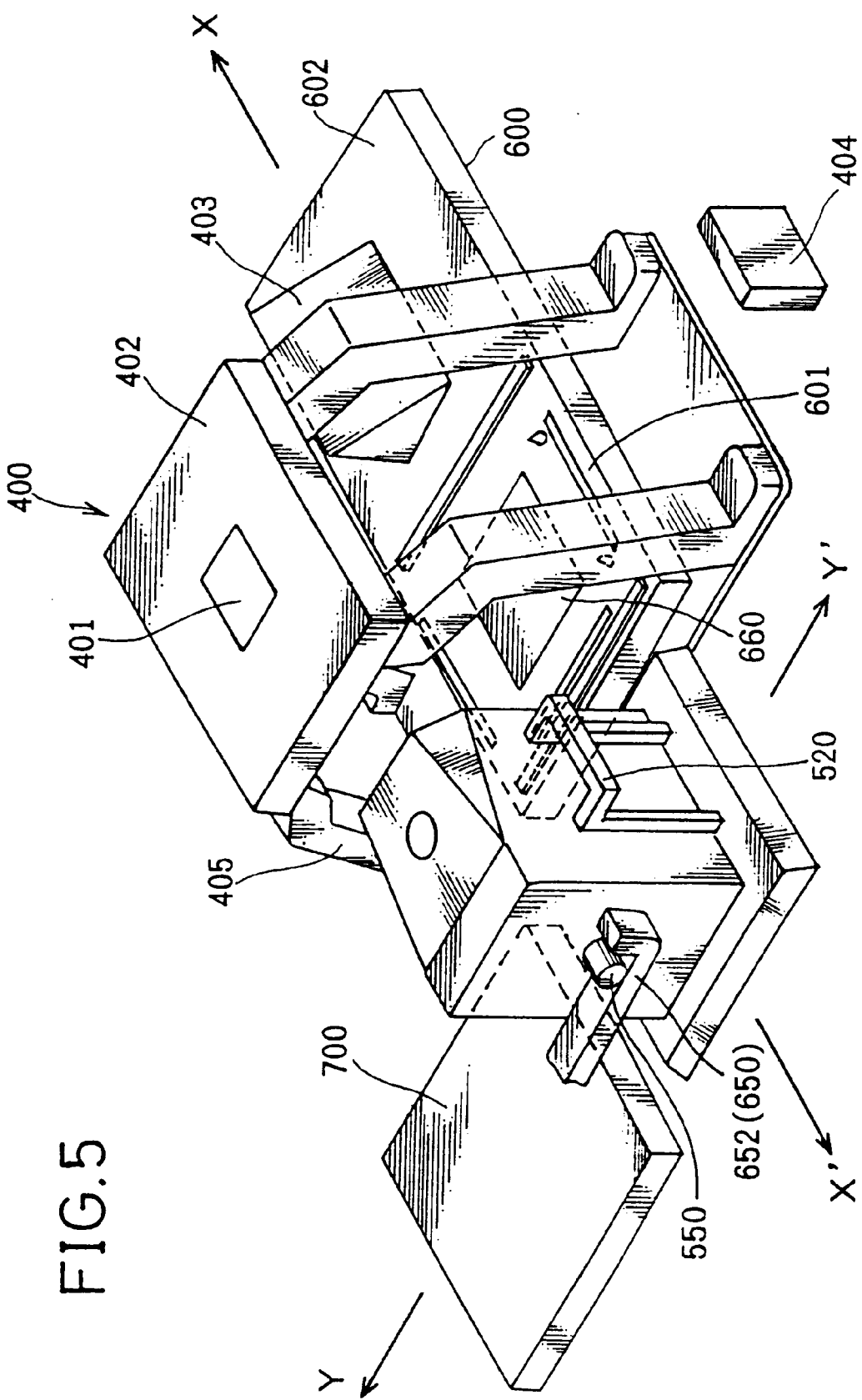
FIG. 5 is a perspective view of the enlargement lens unit when the enlargement lens is supported on support rails.
Figure 6:
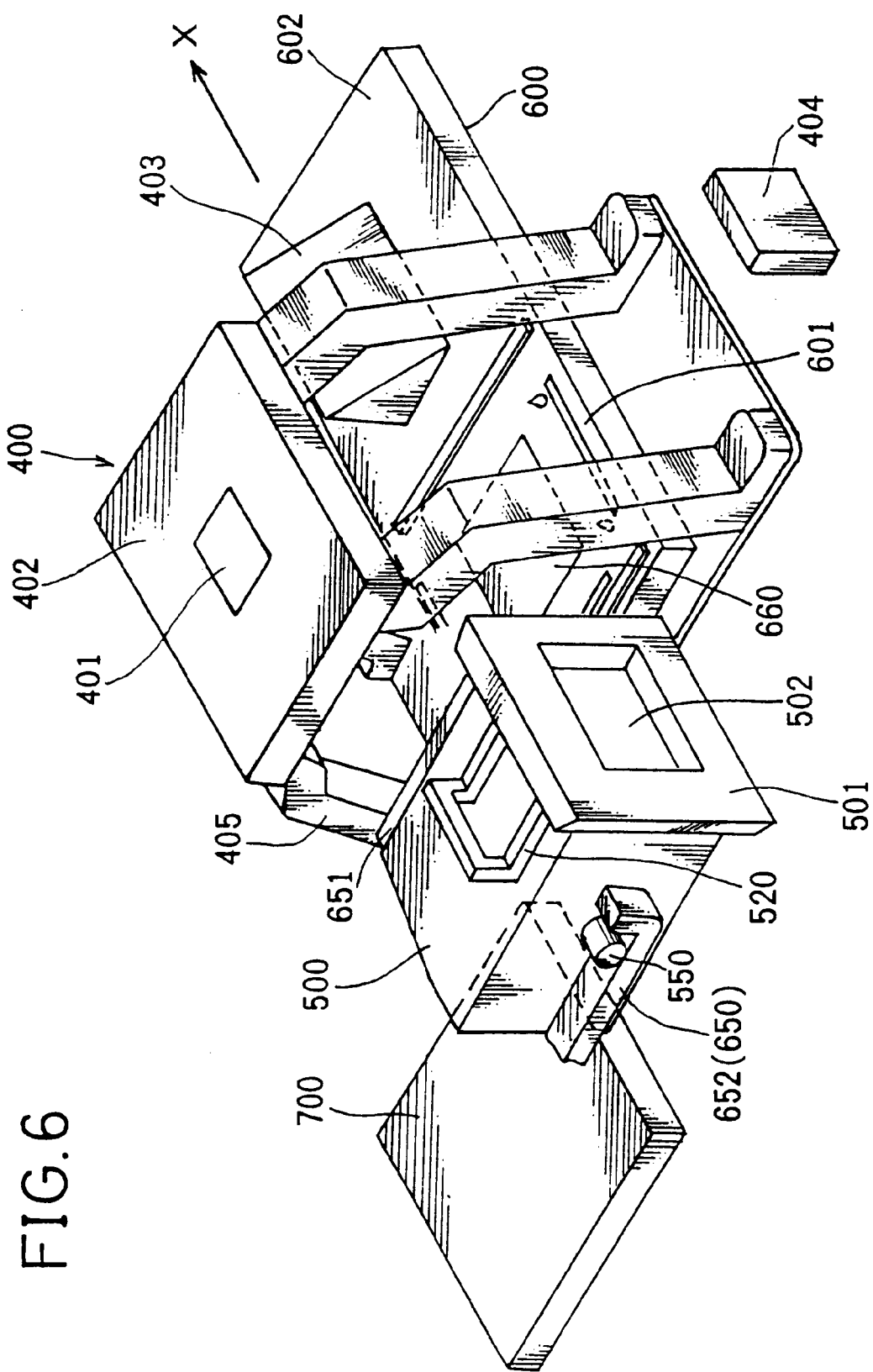
FIG. 6 is a perspective view of the enlargement lens unit when the enlargement lens supported on the support rails is rotated.
Figure 7:
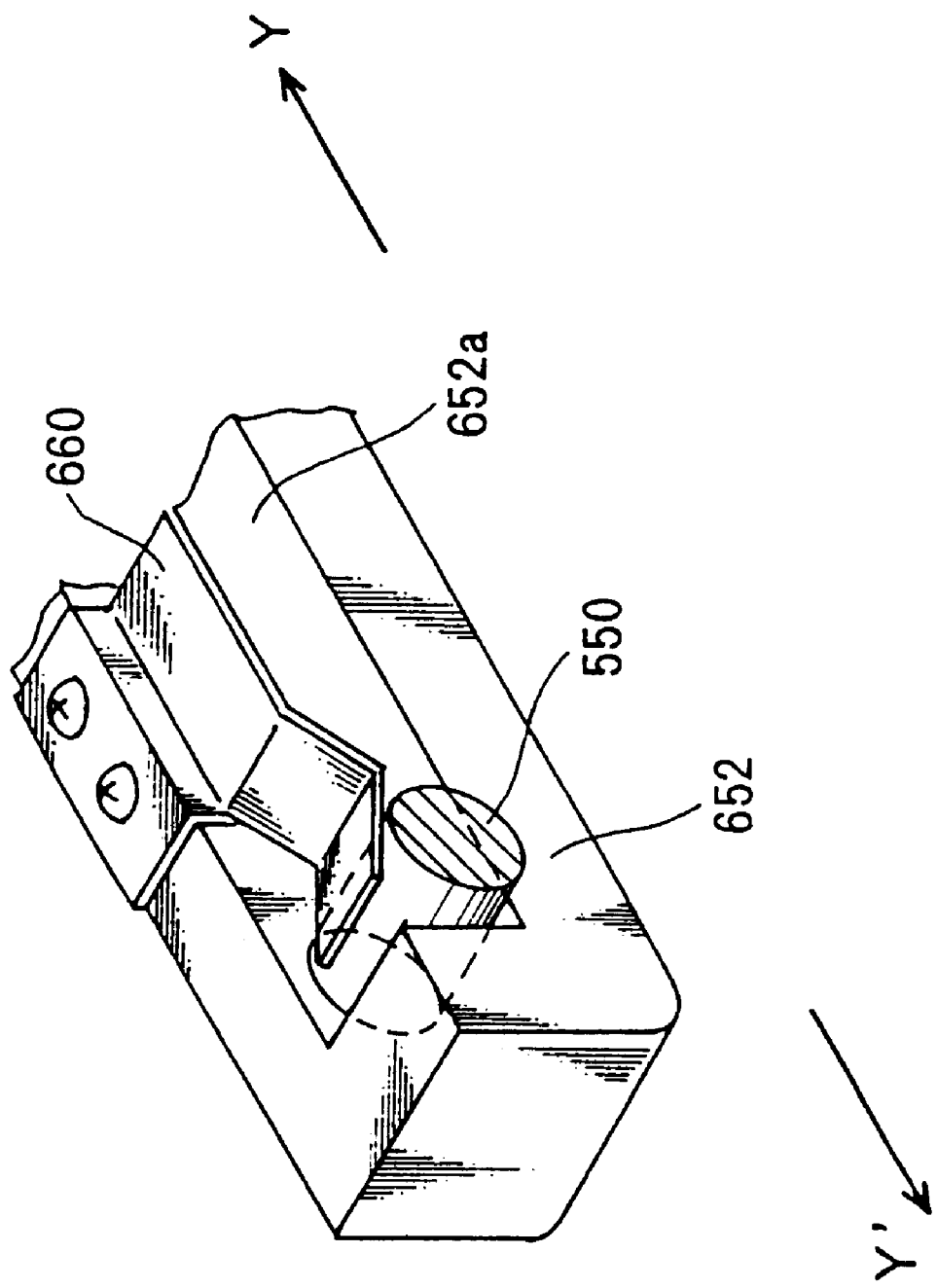
FIG. 7 is a perspective view showing an exemplary construction of a stopper provided in vicinity of a rear end of each support rail in the first photo-processing apparatus.

Next, the detail of the enlargement lens unit 400 is described. FIG. 2 shows a state where an enlargement lens 500 is in an exposure position; FIG. 3 shows a state where it is in a retracted position; FIG. 4 shows a state where it is on a lens storing deck 700; FIG. 5 shows a state where it is supported on support rails provided in the retracted position; and FIG. 6 shows a state where it is rotated on the support rails. Further, FIG. 7 shows an exemplary construction of a stopper provided in vicinity of a rear end of each support rail.

As shown in the respective FIGURES, the enlargement lens unit 400 is provided with a film holder 402, a lens moving deck 600, the enlargement lens 500 such as a zoom lens, a mirror 403, the lens storing deck 700, a movable frame 651, a fixed rail 652, etc. The film holder 402 feeds a negative film to be printed and holds it in a position facing a specified aperture 401. The lens moving deck 600 is driven by a driving mechanism (not shown) such as a ball screw mechanism or a belt driving mechanism and movable along a first direction X–X'. The enlargement lens 500 is mounted in a lens mount area 601 on the lens moving deck 600. The mirror 403 is mounted in a mirror mount area of the lens moving deck 600 and is adapted to bend a propagation direction of light having transmitted through the aperture 401 and the negative film held so as to face the aperture 401 substantially at 90° to introduce the light to an optical sensor 404. The lens storing deck 700 is provided in vicinity of the lens mount area 601 and extends along a second direction Y–Y' substantially normal to the first direction Y–Y' to accommodate the enlargement lens 500 in the case that the lens mount area 601 of the lens moving deck 600 is in the retracted position (see FIG. 3). The movable rail 651 is rotatably mounted on a frame 405 of the enlargement lens unit 400, and the fixed rail 652 is secured to a frame (not shown).

The movable rail 651 and the fixed rail 652 form support rails 650 for rotatably supporting a rotatable shaft 550 of the enlargement lens 500. As shown in FIG. 7, a stopper 660 such as a leaf spring is provided in vicinity of the leading end of the fixed rail 652 to restrict a movement of the rotatable shaft 550 of the enlargement lens 500 along the second direction Y–Y'. Although unillustrated, it is preferable to provide a similar stopper in vicinity of the leading end of the movable rail 651. The above construction stabilizes the position of the rotatable shaft 550 on the support rails 650 and enables the rotation of the enlargement lens 500 in vicinity of the leading end of the support rails 650. Since the position of the rotatable shaft 550 is stable during the rotation of the enlargement lens 500, it prevents the enlargement lens 500 from being rotated in an inclined manner.

The lens moving deck 600 is moved between the position shown in FIG. 2 and the position shown in FIG. 3 along the first direction X–X' by an unillustrated driving mechanism. In the state shown in FIG. 2, the enlargement lens 500 is in the exposure position and the mirror 403 is retracted. Accordingly, in this state, an image in the film is enlargedly projected onto the photosensitive material (printing paper) to expose the photosensitive material by controlling the light source 111. On the other hand, in the state shown in FIG. 3, the enlargement lens 500 is in the retracted position and the mirror 403 is in the exposure position. Thus, the light having transmitted through the film is reflected by the mirror 403 to be incident on the optical sensor 404. The optical sensor 404 detects the state of the film, i.e., the respective color components of yellow, magenta and cyan which are complementary colors of three primary colors (red, blue, green). A ratio of the respective colors and an exposure time during an exposure are determined based on an output of the sensor 404.

The enlargement lens unit 400 is provided in the container 120 shown in FIG. 1. The film holder 402 is positioned below the mirror unit 112. Since the enlargement lens 500 needs to be slidable along the first and second directions X–X', Y–Y', the first and second directions X–X', Y–Y' are so adjusted as to be parallel (horizontal) with the ground. Accordingly, an optic axis of the enlargement lens 500 is at a right angle (normal) to the ground. Further, the container 120 is provided with a door 121 in a position opposite to the retracted position of the lens mount area 601 of the lens moving deck 600, i.e., in a surface of the container 120 normal to the second direction Y–Y'. By opening the door 121, the enlargement lens 500 can manually be moved from the lens mount area 601 of the lens moving deck 600 to the lens storing deck 700 along the second direction Y–Y', from the lens storing deck 700 to the support rails 650 and can be rotated about the rotatable shaft 550.

As shown in FIG. 4, an exposure aperture 660 for projecting the image in the negative film enlarged by the enlargement lens 500 onto the photosensitive material is provided in the center of the lens mount area 601 of the lens moving deck 600. At the opposite sides of the exposure aperture 660 with respect to the first direction X–X' are formed two rails 621, 622 parallel with the second direction Y–Y'. The rails 621, 622 position the enlargement lens 500 by coming into contact with a slidable surface formed in the base of the enlargement lens 500. In the lens mount area 601 are provided a positioning pin 611 and a guide groove 612 for positioning an enlargement lens (e.g., single-focus lens) other than the enlargement lens 500 such as a zoom lens.

Next, the operation of this embodiment is described. In the case that the surface of the enlargement lens 500 is cleaned, the lens mount area 601 of the lens moving deck 600 is moved to the retracted position by operating the operation panel 113 shown in FIG. 1, thereby transferring the state of FIG. 2 to the state of FIG. 3. In this state, the door 121 shown in FIG. 1 is opened, a handle 520 is manually pushed in the direction X, the enlargement lens 500 is temporarily moved from the lens moving deck 600 to the lens storing deck 700 in the direction Y, thereby transferring the state of FIG. 3 to the state of FIG. 4. In the state of FIG. 4, since the lens mount area 601 of the lens moving deck 600 is empty, the movable rail 651 is rotatably made parallel with the fixed rail 652. In this way, the support rails 650 are formed to rotatably support the enlargement lens 500 about the rotatable shaft 550.

Next, the lens mount area 601 of the lens moving deck 600 is moved to the exposure position by operating the operation panel 113. Simultaneously with this operation, the enlargement lens 500 is moved from the lens storing deck 700 to the support rails 650 in the direction Y', thereby transferring the state of FIG. 4 to the state of FIG. 5. At this stage, the enlargement lens 500 is supported by the support rails 650 and the lens moving deck 600 is not therebelow. The enlargement lens 500 is rotated about the rotatable shaft 550 by pulling the handle 520 up, thereby transferring the state of FIG. 5 to the state of FIG. 6. In the state of FIG. 6, a bottom surface 501 of the enlargement lens 500 faces an opening left in the container 120 shown in FIG. 1 by opening the door 121. Accordingly, an operator can clean the surface of the enlargement lens 500 from the side of the operation panel 113 without slipping into the PM unit 200 of the photo-processing apparatus 1 shown in FIG. 1. After the completion of the cleaning, the enlargement lens 500 may be returned to the exposure position by performing the above operations in a reverse sequence.

For example, during the operations of FIGS. 3 to 6 in the first embodiment of the photo-processing apparatus according to the invention, external light leaks into the exposure unit 100 and the dark room of the PM unit 200 through the exposure aperture 660 provided in the lens mount area 601 of the lens moving deck 600. Thus, the photosensitive material (printing paper) is contained inside the dark box 201 during the cleaning of the enlargement lens 500.

Although the support rails 650 are formed by the movable rail 651 and the fixed rail 652 and the enlargement lens unit 400 is provided in the container 120 in the first embodiment, the enlargement lens unit 400 may be insertable into the container 120 from the outside with the door 121 opened. Alternatively, the support rails may be assembled in the container with the door 121 opened.

Next, a second photo-processing apparatus embodying the invention is described with reference to FIGS. 8 and 9. It should be noted that no description is given on the elements identified by the same reference numerals as in the second embodiment since they are substantially the same.

Figure 8:
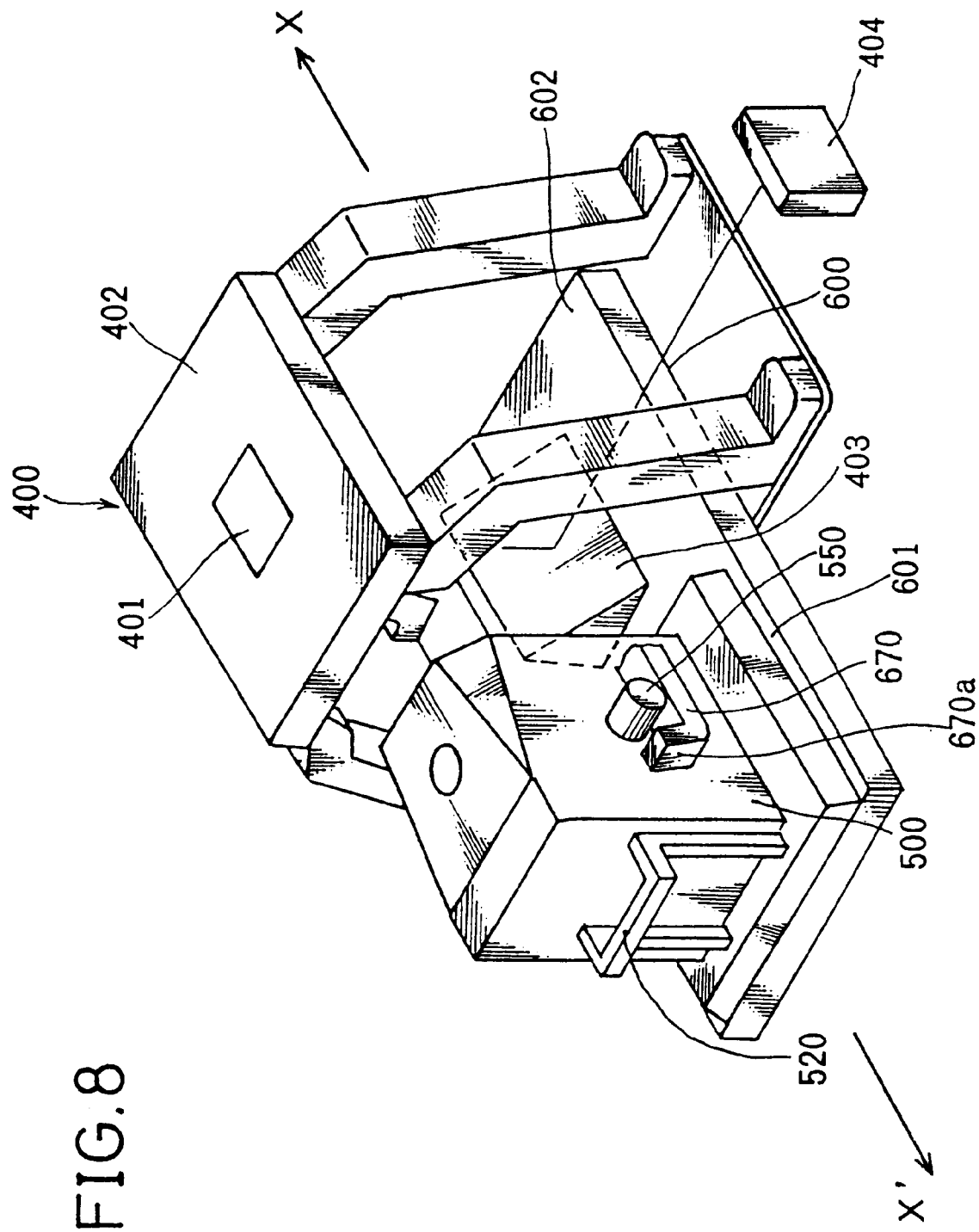
FIG. 8 is a perspective view of an enlargement lens unit of a second photo-processing apparatus embodying the invention, an enlargement lens being in a retracted position.
Figure 9:
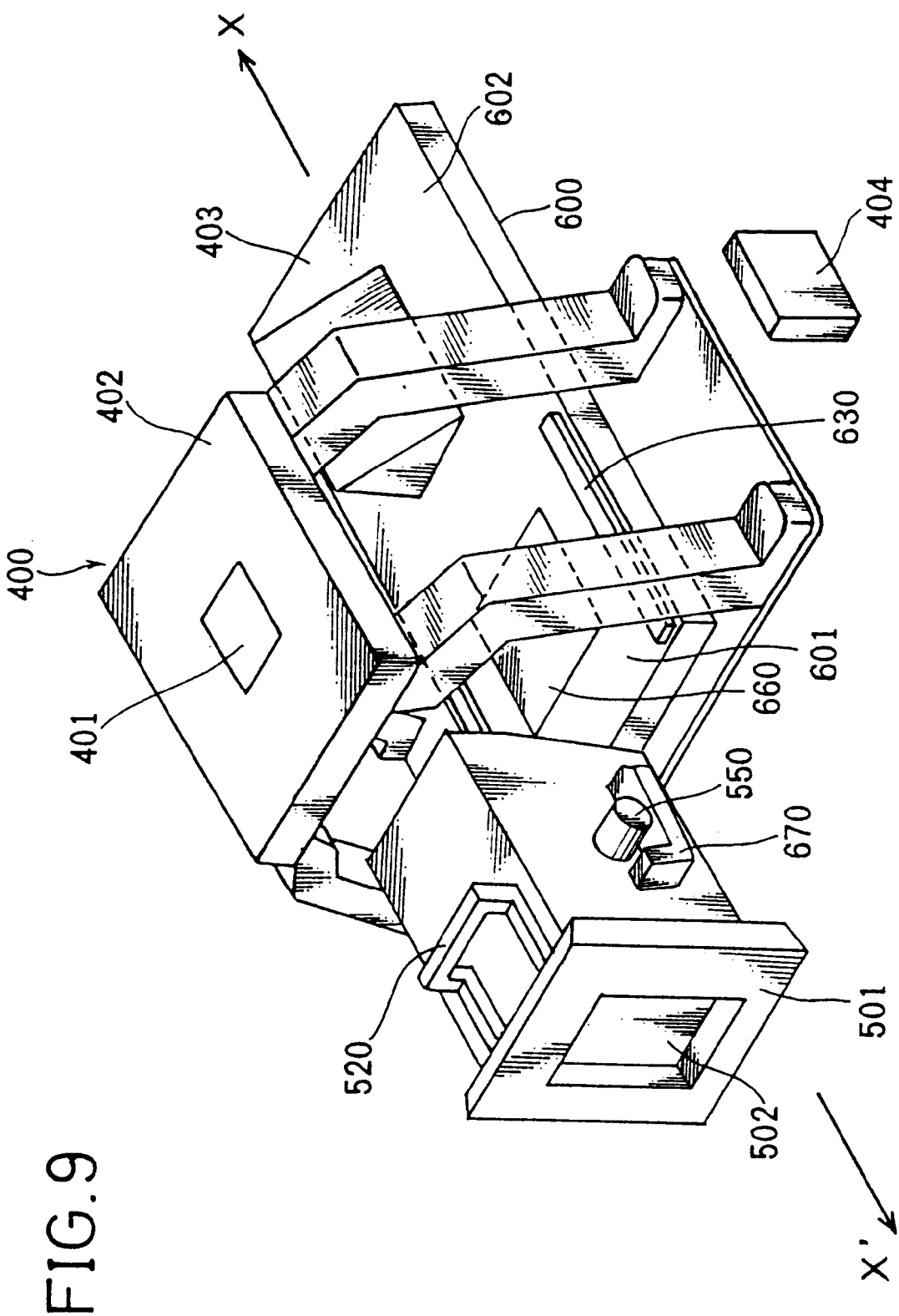
FIG. 9 is a perspective view of the enlargement lens unit of the second photo-processing apparatus when the enlargement lens supported on support rails is rotated.

FIG. 8 shows a state when the enlargement lens 500 is in the retracted position, and FIG. 9 shows a state when it is rotated on supported rails 670. In the second embodiment, the support rails 670 are formed by two parallel rails fixed to a frame (not shown) of the enlargement lens unit 400 and parallel with the first direction X–X'. In this case, a door (not shown) of the container is provided in a surface normal to the first direction X–X' (e.g., a hatched portion 130 in the photo-processing apparatus shown in FIG. 1) different from the first embodiment.

The leading ends of the support rails 670 are tapered (not shown) such that the height of the rail surfaces of the leading ends of the support rails 670 is slightly lower than the bottom of the rotatable shaft 500 of the enlargement lens 500 on the lens mount area 601 of the lens moving deck 600. Further, the rail surfaces of rear ends 670a of the support rails 670 are slightly higher than the bottom of the rotatable shaft 500 of the enlargement lens 500 on the lens mount area 601 of a lens moving unit 600 and are horizontal. Such a construction enables the movement of the lens moving deck 600, the movement of the lens mount area 601 to the retracted position and the automatic support of the enlargement lens 500 by the support rails 670.

The second embodiment has a disadvantage that the position of the door provided in the container is limited, but the lens storing deck 700 can be dispensed with and the construction of the enlargement lens unit 400 can be made simpler and smaller. Further, since the enlargement lens 500 needs not be temporarily transferred to the lens storing deck, the enlargement lens 500 can more easily be cleaned.

It is preferable in the second embodiment as well to provide stoppers as shown in FIG. 7 in vicinity of the rear ends 670 of the support rails 670.

Although the rotatable shaft 550 is provided at the enlargement lens 500 and the support rails 650, 670 are provided on the frame of the enlargement lens unit 400 in the foregoing embodiments, the arrangement is not limited to the above. A converse arrangement in which the support rails are provided on the side walls of the main body of the enlargement lens 500 and a shaft engageable with the support rails are provided on the frame of the enlargement lens unit 400 may be adopted.

As described above, the inventive photo-processing apparatus is provided with a lens moving deck including a lens mount area for mounting an enlargement lens and a mirror mount area for mounting a mirror for introducing light having transmitted through a film to an optical sensor, and being movable along a first direction so that the lens mount area can be located in either one of an exposure position and a retracted position which are located next to each other, a supporter provided in the retracted position of the lens mount area for engaging the enlargement lens and rotatably supporting the enlargement lens, and a container for containing the lens moving deck therein to block an exposure to external light, the container comprising a door which is openably and closably provided in vicinity of the retracted position.

The enlargement lens mounted in the lens mount area is moved to the retracted position by driving the lens moving deck, and is rotatably supported by the support rails. By opening the door of the container and rotating the enlargement lens about its rotatable shaft in this state, the lens surface is exposed to the outside via the door of the container. Thus, an operator can clean the enlargement lens without slipping into the dark room of the photo-processing apparatus. In other words, the enlargement lens can more easily and readily be cleaned. Further, since the surface of the enlargement lens can be seen, the surface of the enlargement lens can easily completely be cleaned.

In the above construction, the supporter may include a pair of support rails provided in parallel to the first direction and a rotatable shaft extending normal to the first direction, and the door may be provided in a surface of the container normal to the first direction. The supporter may include a rotatable shaft parallel to a main body of the enlargement lens and a pair of parallel support rails provided in a retracted portion of the frame of the enlargement lens unit. The leading ends of the support rails are tapered such that the height of the rail surfaces at the leading ends of the support rails is slightly lower than the bottom of the rotatable shaft of the enlargement lens. The height of the rail surfaces at the rear ends of the support rails is set slightly higher than the bottom of the rotatable shaft of the enlargement lens and horizontal. Such a construction enables a movement of the lens mount area to the retracted position by moving the lens moving deck and, at the same time, an automatic support of the enlargement lens by the support rails. It should be noted that similar effects are obtainable even if the support rails are provided on the side walls of the main body of the enlargement lens and the rotatable shaft is provided on the frame of the enlargement lens.

Alternatively, a lens storing deck for storing the enlargement lens may be provided in a position adjacent to the retracted position of the lens mount area. Particularly, it is preferable to set the lens mount area of the lens moving deck and a lens storing surface of the lens storing deck at the same height so as to make a main lens slidable from the lens moving deck to the lens storing deck. In such a construction, despite its simple structure, the position and direction of the support rails are limited because the support rails are fixed to a part of the frame of the enlargement lens unit. However, with this construction, the support rails may be assembled in the retracted position or partially or entirely moved after the enlargement lens is temporarily transferred to the lens storing deck. By doing so, the position, direction and construction of the support rails can freely be chosen. Further, the position and the direction of the door of the container can also freely be chosen.

Figure 10:
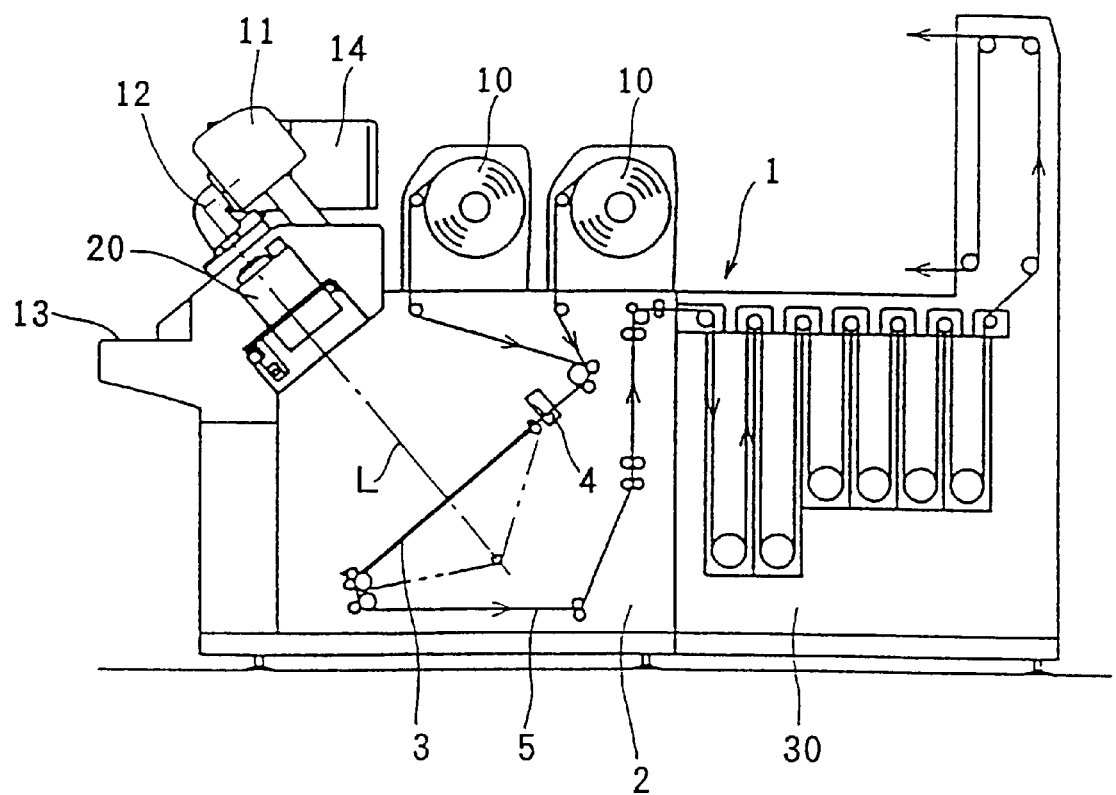
FIG. 10 is a section showing the schematic construction of a conventional photo-processing apparatus.
Figure 11:
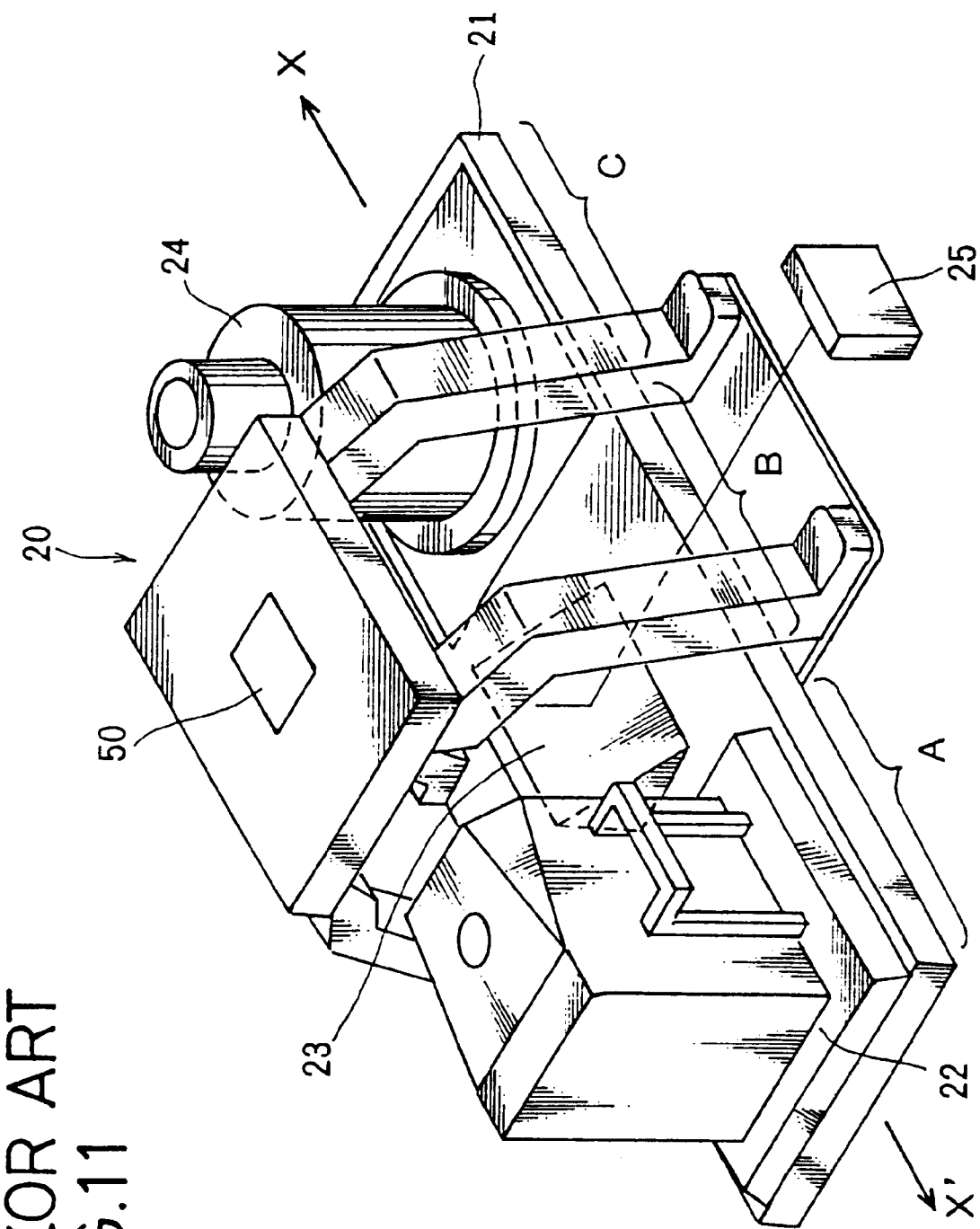
FIG. 11 is a perspective view showing the construction of a lens moving deck of the conventional photo-processing apparatus.

The lens storing deck is preferably provided in a second direction substantially normal to the first direction. Specifically, the width of the enlargement lens unit including the lens moving deck and the lens storing deck can be reduced by arranging a movable range of the lens moving deck and that of the lens storing deck substantially in L-shape. Particularly, if the light source is provided substantially normal to the optic axis of the enlargement lens unit as shown in FIG. 10, the lens storing deck may be provided in an empty space below the light source. In this case, the dimension of the photo-processing apparatus along the first direction can be narrowed without changing the length thereof along the second direction.

The supporter may alternatively include a pair of support rails provided in parallel to the second direction and a rotatable shaft extending normal to the second direction and wherein the door is provided in a surface of the container normal to the second direction. With such a construction, the enlargement lens can be cleaned from the side of the operation panel in the case that the operation panel is provided in front of the light source and the enlargement lens unit as shown in FIG. 10.

It is preferable that the support rails are two parallel rails and at least one rail is movable. With such a construction, an interference of the enlargement lens mounted on the lens moving deck with the support rails during the movement of the lens moving deck can be prevented particularly in the case that the support rails are provided in parallel to the second direction.

The first and second directions may be horizontal, respectively. Specifically, the enlargement lens can smoothly be moved without giving rise to an unnecessary horizontal component of gravity when the enlargement lens is moved from the lens moving deck to the lens storing deck and vice versa.

A stopper for restricting a horizontal movement of the rotatable axis of the enlargement lens may further be provided in vicinity of the rear end of at least one support rail. With such a construction, the center position of the rotatable axis is stabilized when the enlargement lens supported on the support rails is rotated. This prevents the enlargement lens from being rotated in an inclined manner.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A photo-processing apparatus comprising:
   a lens moving deck including a lens mount area for mounting an enlargement lens and a mirror mount area for mounting a mirror for introducing light having transmitted through a film to an optical sensor, and being movable along a first direction so that the lens mount area can be located in either one of an exposure position and a retracted position which are located next to each other;
   a supporter provided in the retracted position of the lens mount area for engaging the enlargement lens and rotatably supporting the enlargement lens; and
   a container for containing the lens moving deck therein to block an exposure to external light, the container including a door which is openably and closably provided in vicinity of the retracted position.

2. A photo-processing apparatus according to claim 1, wherein the supporter includes a pair of support rails provided in parallel to the first direction and a rotatable shaft extending normal to the first direction, and the door is provided in a surface of the container normal to the first direction.

3. A photo-processing apparatus according to claim 1, further comprising a lens storing deck for storing the enlargement lens in a position adjacent to the retracted position of the lens mount area.

4. A photo-processing apparatus according to claim 3, wherein the supporter includes a pair of support rails provided in parallel to a second direction and a rotatable shaft extending normal to the second direction and the door is provided in a surface of the container normal to the second direction.

5. A photo-processing apparatus according to claim 3, wherein the support rails include two parallel rails and at least one rail is movable.

6. A photo-processing apparatus according to claim 3, wherein the lens storing deck is provided in a second direction substantially normal to the first direction.

7. A photo-processing apparatus according to claim 6, wherein the supporter includes a pair of support rails provided in parallel to a second direction and a rotatable shaft extending normal to the second direction and the door is provided in a surface of the container normal to the second direction.

8. A photo-processing apparatus according to claim 7, wherein the support rails include two parallel rails and at least one rail is movable.

9. A photo-processing apparatus according to claim 1, wherein the first and second directions are horizontal, respectively.

10. A photo-processing apparatus according to claim 1, further comprising a stopper for restricting a horizontal movement of the rotatable axis of the enlargement lens in vicinity of the rear end of at least one support rail.

* * * * *